United States Patent Office 2,908,672
Patented Oct. 13, 1959

2,908,672

POLYMERIZATION OF CONJUGATED DIOLEFINS WITH A CATALYST CONSISTING OF A BINARY ALLOY OF A GROUP II–A METAL AND LITHIUM

Harold Leonard Jackson, Wilmington, Del., assignor to E. I. du Pont de Nemours and Company, Wilmington, Del., a corporation of Delaware No Drawing. Application March 21, 1957
Serial No. 647,496

13 Claims. (Cl. 260—94.2)

This invention relates to a new process for polymerizing 1,3-dienes.

A continuing goal for research in the field of synthetic rubber technology has been the development of an artificial rubber with properties approximating very closely those of natural Hevea rubber. One of the difficulties encountered has been obtaining a polyisoprene with the cis-1,4 internal structure of the natural product [for possible structures see, for example, Ind. and Eng. Chem. 48, 785, Figure 1 (1956)].

Recently, the proportion of the cis-1,4-isomeric structure in artificial rubber has been increased by the use of finely-divided lithium dispersed in petroleum jelly as a catalyst for the polymerization of isoprene. [Ind. and Eng. Chem. 48, 778–783 (1956)]. Lithium, however, is a relatively rare and expensive metal and is somewhat difficult to handle.

A general object of this invention is provision of a novel process for polymerizing 1,3-dienes.

Another object is provision of a method for polymerizing 1,3-diene hydrocarbons, isoprene in particular, that gives improved yields of the cis-1,4-isomer.

A further object is provision of a novel method for polymerizing 1,3-diene hydrocarbons with enhanced yields of the cis-1,4-isomer which avoids some of the disadvantages of methods used heretofore.

The above-mentioned and yet further objects are achieved in accordance with this invention by a process in which a 1,3-diene hydrocarbon monomer is polymerized in contact with a catalyst consisting of a comminuted alloy of lithium and a metal of group II–A of the periodic system having an atomic number between 12 and 56.

In the preferred practice of the invention, a reactor which has been purged of moisture and oxygen by sweeping it with an inert gas, e.g., argon, is charged with an alloy of lithium with the group II–A metal, a dry inert organic solvent, and stainless steel balls (⅜" diameter), evacuated and further charged with the selected 1,3-diene hydrocarbon. The reactor is closed and shaken at 25–120° C. for from 1–24 hours. Thereafter the reactor is opened, the contents discharged, and the desired polymer is isolated by methods well known to those skilled in the art.

It will be understood that the process outlined can be used for copolymerization as well as homopolymerization.

The group II–A metals of atomic number 12–56 alloyed with lithium to form the catalyst of this invention are magnesium, calcium, strontium, and barium. The ratio of group II–A metal to lithium in the alloy in terms of weight percent may vary from 199:1 to 9:1. The alloys which give the best results are those in which the ratio of group II–A metal to lithium in mole percent is from 19:1 to 9:1.

The comminuted alloy in the form of powder or of turnings is used in amount varying from 0.1–10% by weight of the 1,3-diene hydrocarbon being polymerized. The best results from the standpoint of reaction rate and polymer yield per unit weight of catalyst are obtained with about 0.5%–5% by weight and this quantity is most generally used.

Any 1,3-diene hydrocarbon can be polymerized by this invention. For practical reasons the 1,3-diene hydrocarbons employed are those which contain up to 12 carbon atoms. A preferred class are those dienes which conform to the general formula:

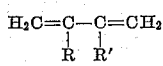

in which the R's are hydrogen or hydrocarbon, preferably monovalent hydrocarbon radicals, particularly short chain alkyl radicals, i.e., when hydrocarbon, containing not more than six carbon atoms, and phenyl. The two R's may also be combined to form a single divalent radical. Especially preferred are the 1,3-butadienes, e.g., 1,3-butadiene, 2-methyl-1,3-butadiene, 2,3-dimethyl-1,3-butadiene, 2 - phenyl - 1,3 - butadiene, 1,2,4 - trimethylenecyclohexane, and the like.

The polymerization is usually carried out at temperatures in the range of 25–120° C. Because the best yields of polymer at good reaction rates are obtained within the more restricted range of 40–85° C., this range embraces the temperature conditions usually employed.

Pressure is not particularly critical in the process of this invention and autogeneous reaction pressure will generally be employed.

Reaction time is likewise not critical although several hours, e.g., up to 24, will generally be utilized to ensure a good yield.

Although a reaction medium is not essential, one is generally employed. Useful media are cyclohexane, methyl cyclohexane, n-hexane, n-pentane, tetrahydro- and decahydronaphthalenes, etc. When a reaction medium is used it may vary from one-half to 50 times the weight of the 1,3-diene hydrocarbon.

In the preferred practice, steel balls are included in the reaction charge to provide a milling action during the polymerization. The steel balls are conveniently ⅜" in diameter but there is nothing critical about this figure. The balls can occupy from one-fifth to one-tenth of the reaction volume.

The examples which follow are submitted to illustrate and not to limit this invention. Percentages and the ratios of metals employed in the catalysts are given in terms of weight. The failure of the percentage compositions determined by infrared analyses to total 100% is due to experimental errors in reading the infrared spectra.

EXAMPLE 1

*Polymerization of butadiene with a calcium/lithium alloy*

A. Into a 400-ml. stainless steel-lined pressure vessel, which had been purged with argon, were placed 1.0 g. of turnings of a 94/6 calcium/lithium alloy; 40 ml. of cyclohexane previously dried with sodium; and 25 stainless steel balls (⅜" diameter). The pressure vessel was again flushed with argon, closed and cooled in solid carbon dioxide-acetone mixture. The vessel was then partially evacuated and 54 g. of butadiene was distilled into it. The vessel was closed and shaken at 50° C. under autogenous pressure for 16 hours. When the pressure vessel was opened, it contained a mass of rubber-like polymer. The finely-divided alloy catalyst and the stainless steel balls were removed by treating the polymer with carbon disulfide and filtering the resulting polymer solution. The polymer was formed in essentially complete conversion.

Examination of the infrared spectrum of a solution of this polybutadiene in carbon disulfide by the method of Hampton, Anal. Chem. 21, 923–6 (1949), indicated that the polymer contained 51% cis-1,4-units, 35% trans-1,4-units and 10% 1,2-units.

B. In contrast to the above result, only 3.7 g. of high-boiling viscous liquid, together with a gummy polymer, was obtained from butadiene and calcium metal turnings under conditions identical to those of the above experiment.

In another experiment in which no metal other than the stainless steel pressure vessel and the stainless steel balls were used, only 2.0 g. of a high-boiling liquid and a rubbery solid was formed.

C. Lithium metal itself also polymerized butadiene when used according to the procedure described above. The resulting polybutadiene, however, differed from that formed with the 94/6 calcium/lithium alloy as indicated by its infrared spectrum. This lithium-catalyzed polybutadiene was shown by the method of Hampton (loc. cit.) to possess only 38% of cis-1,4-units; 37% of trans-1,4-units and 11% of 1,2-units. At noted above the calcium/lithium alloy catalyzed polybutadiene contained 51% cis-1,4-units. Data recently described (F. C. Foster, Dallas, A.C.S. meeting, spring 1956), indicate that polybutadiene prepared by other research workers using lithium as the catalyst contains 35% cis-1,4-units.

The influence of catalyst composition on polybutadiene structure is shown in the table.

TABLE.—POLYBUTADIENES

| Polymer | Catalyst | Percent Cis-1,4 | Percent Trans-1,4 | Percent 1,2 |
| --- | --- | --- | --- | --- |
| 1[1] | 94/6 Ca/Li | 51 | 35 | 10 |
| 2[1] | 94/6 Ca/Li | 61 | 23 | 12 |
| 3[1] | 94/6 Ca/Li | 56 | 23 | 7 |
| 4[1] | 99/1 Ca/Li | 43 | 44 | 9 |
| 5[1] | 90/10 Mg/Li | 44 | 41 | 12 |
| 6[1] | Li | 38 | 37 | 11 |
| [2] | Li | 35 | 52 | 13 |
| [2] | Emulsion System | 18 | 64 | 18 |

[1] Values determined from infrared spectrum of a solution of the polybutadiene in carbon disulfide. The composition was determined by the method of Hampton, Anal. Chem. 21, 923–6 (1949).
[2] Values may be found in "Advances in Chemistry," Series No. 19, American Chemical Society, p. 27 (May 1957).

EXAMPLE 2

*Polymerization of butadiene with a 94/6 calcium/lithium alloy*

Using the procedure described in Example 1, a pressure vessel charged with 4.0 g. of 94/6 calcium/lithium alloy turnings, 45 ml. of dry cyclohexane, 54 g. of butadiene and 25 stainless steel balls was shaken at 69–80° C. for 16 hours at autogenous pressure. The butadiene was converted quantitatively to a rubbery polymer.

EXAMPLE 3

*Polymerization of butadiene with a 99/1 calcium/lithium alloy*

Substitution of 2.0 g. of 99/1 calcium/lithium alloy turnings for the alloy catalyst of Example 1 also brought about polymerization of butadiene in essentially complete conversion to a high molecular weight rubbery polymer.

EXAMPLE 4

*Polymerization of butadiene with a 90/10 magnesium/lithium alloy*

Using the same procedure described in Example 1, a mixture of 1.0 g. of 90/10 magnesium/lithium alloy turnings, 40 ml. of dry cyclohexane, 54 g. of butadiene and 25 stainless steel balls were shaken at autogenous pressure, 50° C. for 16 hours to give an essentially quantitative yield of polybutadiene. As shown in the table the infrared spectrum of a solution of this polybutadiene in carbon disulfide indicated 44% of cis-1,4-units, 41% of trans-1,4-units and 12% 1,2-units.

EXAMPLE 5

*Polymerization of isoprene with a 94/6 calcium/lithium alloy*

A 400-ml. stainless steel-lined pressure vessel was purged with argon and charged with 4.0 g. of 94/6 calcium/lithium alloy turnings, 45 ml. of dry cyclohexane, 25 stainless steel balls (⅜″ diameter), and 68 g. of isoprene which had been freshly distilled and dried over silica gel. The pressure vessel was closed and shaken at 75° C. under autogenous pressure for 16 hours. From the reaction product was isolated 15 g. of rubbery polymer. This polyisoprene was completely soluble in carbon disulfide. Infrared spectrum analysis indicated an all cis-1,4-structure, very similar to that of natural Hevea rubber.

EXAMPLE 6

*Polymerization of 1,2,4-trimethylenecyclohexane with a 94/6 calcium/lithium alloy*

A 400-ml. stainless steel-lined pressure vessel was purged with argon and charged with 0.75 g. of 94/6 calcium/lithium alloy turnings, 40 ml. of dry cyclohexane, 25 stainless steel (⅜″ diameter) balls and 15 g. of 1,2,4-trimethylene cyclohexane. The pressure vessel was shaken at 75° C. under autogenous pressure for 16 hours. The product was a viscous liquid which yielded a white solid polymer on addition to methyl alcohol. This polymer was soluble in benzene and carbon disulfide. Films of the polymer cast from these solutions became insoluble when allowed to dry in air.

The formula of 1,2,4-trimethylenecyclohexane is:

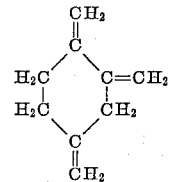

It may be prepared by the procedure of Example 1 of the Benson U.S. patent application Serial Number 615,015, filed October 10, 1956, now Patent No. 2,839,510, as follows:

A stainless steel pressure vessel having a capacity of 1.4 liters is charged under nitrogen with 250 ml. of anhydrous tetrahydrofuran, 10 g. of calcium carbide (to insure anhydrous conditions) and 5 g. of bis(triphenyl phosphite)nickel dicarbonyl, $[(C_6H_5O)_3P]_2Ni(CO)_2$. The vessel is flushed with nitrogen, cooled in a carbon dioxide/acetone bath and evacuated. Allene (100 g.) is distilled into the vessel, which is then sealed, equipped with a pressure gauge and placed in a rocker. The vessel is heated with agitation to 80° C. over two hours and the temperature is then increased slowly until the reaction begins, as indicated by a pressure drop. Heating is continued at 108–109° C. for 5.5 hours. The vessel is then opened.

The reaction product is separated from the calcium carbide by decantation, petroleum ether added, and the organic layer washed four times with water. The organic solution is dried with magnesium sulfate and distilled through a short column. The fraction boiling from 58° C. at 200 mm. to 62° C. at 0.1 mm. is collected (112 g.) leaving 66.8 of a viscous, brown material in the still pot. The distillate is treated with phenothiazine to inhibit polymerization and redistilled through an efficient fractionating column. Trimethylenecyclohexane is obtained as a colorless liquid boiling at 67.5–69° C. at 60 mm. pressure, $n_D^{25}$ 1.4912–1.4919. The nuclear magnetic resonance spectrum indicates that the product contains approximately 85% of 1,2,4-trimethylenecyclohexane and 15% of 1,3,5-trimethylenecyclohexane. The mixture of isomers is separated into its components by means of gas chromatography, using the general technique described by N. H. Ray in J. App. Chemistry 4, 21 (1954).

EXAMPLE 7

*Copolymerization of 1,2,4-trimethylenecyclohexane and butadiene with a 94/6 calcium/lithium alloy*

Under an atmosphere of argon, 0.75 g. of 94/6 calcium/lithium alloy turnings, 40 ml. of dry cyclohexane, 5.0 g. of 1,2,4-trimethylenecyclohexane and 25 stainless steel balls were placed in a 400-ml. pressure vessel. The vessel was closed, cooled in Dry Ice/acetone, partially evacuated and 50 g. of butadiene was distilled into the cold vessel. After shaking at 50° C. under autogenous pressure for 12 hours, a tough rubbery mass of polymer was removed from the vessel. Films cast from solutions of this copolymer became insoluble when allowed to dry in air.

The ability of the group II–A metals to cooperate with lithium in increasing the amount of the cis-1,4-isomer to be expected as the result of polymerizing a 1,3-diene is not precisely understood. The group II–A metals by themselves have no value as catalysts as shown by Example 1B above. Lithium alone is, of course, quite valuable but its production of the cis-1,4-isomer is enhanced when it is alloyed with the group II–A metal.

The activity of the second metal as a co-catalyst with lithium is specific to the group II–A metals. Control runs following essentially the procedure of Example 1A except that aluminum was substituted for calcium in the alloys gave negative results. In three experiments 0.5, 1.0 and 2.0 g. of a 94/6 aluminum/lithium alloy were respectively used in attempted polymerizations. No polymer was obtained in any of the three runs. Aluminum not only failed to cooperate with the lithium but actually destroyed the inherent catalytic power of the latter.

The polymers obtained in accord with the process of this invention possess essentially a cis-structure with a major portion being 1,4. These polymers are superior to conventional synthetic rubbers in having low hysteresis and excellent properties at elevated temperatures and thus resemble natural rubber in many of its essential properties.

The process of this invention makes possible for the first time to polymerize a 1,3-diene hydrocarbon to a high polymer closely matching natural rubber in its essential properties, employing a low-cost catalyst. These synthetic rubbers are admirably adapted for use in tires and in other applications where good properties at elevated temperatures are required.

Since obvious modifications in the instant process will occur to those skilled in the chemical arts, I propose to be bound solely by the appended claims.

The embodiments of the invention in which an exclusive property or privilege is claimed are defined as follows:

1. The process for the polymerization of at least one 1,3-diene having up to 12 carbon atoms and of the formula:

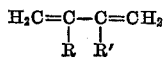

wherein R and R' are selected, in sufficient number to satisfy the valences of the carbons to which they are attached, from the group consisting of hydrogen, monovalent hydrocarbon radicals and, taken together, a divalent hydrocarbon radical, which comprises contacting said 1,3-diene with about 0.1–10% by weight, based on the weight of 1,3-diene, of a catalyst consisting essentially of a binary alloy of a metal of group II–A of the periodic system having an atomic number between 12 and 56 and lithium in which the weight ratio of the group II–A metal to lithium is from 199:1 to 9:1 at a temperature of about 25–120° C. for a period sufficient to form a polymer.

2. The invention of claim 1 in which the diene is contacted with the catalyst in an inert organic reaction medium.

3. The invention of claim 1 in which the catalyst is an alloy of calcium and lithium.

4. The invention of claim 1 in which the catalyst is an alloy of magnesium and lithium.

5. The invention of claim 1 in which the diene is butadiene.

6. The invention of claim 1 in which the diene is isoprene.

7. The invention of claim 1 in which the diene is 1,2,4-trimethylenecyclohexane.

8. The invention of claim 1 in which the temperature is about 40–85° C.

9. The method of polymerizing butadiene which comprises contacting the same with about 0.1–10% by weight, based on the weight of butadiene, of a comminuted alloy of a metal of group II–A of the periodic system having an atomic number between 12 and 56 and lithium in which the weight ratio of the group II–A metal to lithium is from 199:1 to 9:1 at a temperature of about 25–120° C. for a period sufficient to form a polymer.

10. The invention of claim 9 in which the metal of group II–A is calcium and the temperature is about 40–85° C.

11. The invention of claim 9 in which the metal of group II–A is magnesium and the temperature is about 40–85° C.

12. The method of polymerizing isoprene which comprises contacting the same with about 0.1–10% by weight, based on the weight of isoprene, of a comminuted alloy of a metal of group II–A of the periodic system having an atomic number between 12 and 56 and lithium in which the weight ratio of the group II–A metal to lithium is from 199:1 to 9:1 at a temperature of about 25–120° C. for a period sufficient to form a polymer.

13. The invention of claim 12 in which the metal of group II–A is calcium and the temperature is about 40–85° C.

References Cited in the file of this patent

UNITED STATES PATENTS

| | | |
|---|---|---|
| 1,039,741 | Hofman et al. | Oct. 1, 1912 |
| 1,058,056 | Harries | Apr. 8, 1913 |
| 1,073,116 | Harries | Sept. 16, 1913 |

UNITED STATES PATENT OFFICE

CERTIFICATE OF CORRECTION

Patent No. 2,908,672 October 13, 1959

Harold Leonard Jackson

It is hereby certified that error appears in the printed specification of the above numbered patent requiring correction and that the said Letters Patent should read as corrected below.

Column 1, line 66, for "mole" read -- weight --; column 2, line 28, for "autogeneous" read -- autogenous --.

Signed and sealed this 26th day of April 1960.

(SEAL)
Attest:

KARL H. AXLINE
Attesting Officer

ROBERT C. WATSON
Commissioner of Patents